June 25, 1957  K. DANIEL  2,797,101
METHOD AND APPARATUS FOR MANUFACTURING ENDLESS SOUND TAPES
Filed April 29, 1953
FIG. 1.
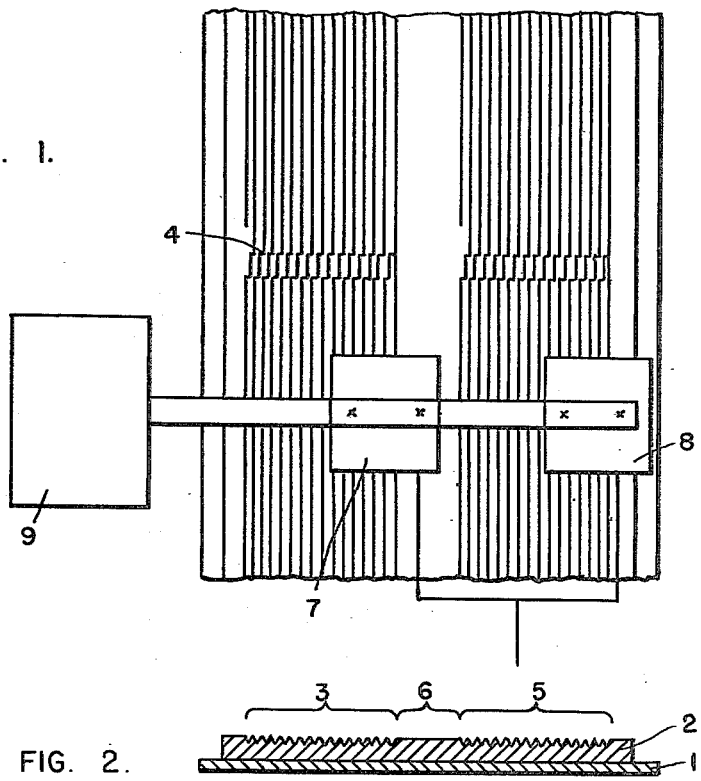
FIG. 2.
FIG. 3.
FIG. 4.
FIG. 5.
FIG. 6.
INVENTOR
KARL DANIEL
BY
ATTORNEYS

United States Patent Office 2,797,101
Patented June 25, 1957

2,797,101

METHOD AND APPARATUS FOR MANUFACTURING ENDLESS SOUND TAPES

Karl Daniel, Porz, near Koln (Rhine), Germany

Application April 29, 1953, Serial No. 351,974

1 Claim. (Cl. 274—46)

This invention relates to endless sound tapes the sound track of which consists of a number of sound lines extending parallel, or substantially parallel, to the edge of the tape and joining each other. The invention is particularly concerned with the manufacture of these sound tapes by molding in the mass of the sound tape the sound record negative of a band-formed matrix produced from a recorded original wax band.

An object of the present invention is to reduce the costs of sound tape production.

Another object of the present invention is the provision of a process for manufacuring endless sound bands wherein the time period required for the manufacture of the matrix is substantially reduced as compared to prior art methods.

A further object is to improve the capacity and productivity of a tape manufacturing establishment by improving the matrix production.

Other objects of the present invention will become apparent in the course of the following specification.

In accomplishing the objects of the present invention it was found desirable to cut at least two sound records side by side in a wax band, these records being cut either simultaneously or successively, and each record consisting of a group of sound lines, the width of the unrecorded zone of the band situated between the adjacent records being substantially equal to twice the width of the unplayed marginal edges of the finished sound tape. Upon manufacture of the wax band a band-form matrix containing negatives of the sound records is produced from the wax band whereupon sound records from this matrix are simultaneously molded in the sound tape mass. Finally, the tape produced as a result of this molding operation is cut into equal parts longitudinally between the individual sound records. Finally, each of the tapes is formed into an endless band by joining the edges of the tape.

Due to this process it is possible to produce matrices for at least two sound performances in practically the same time which was previously necessary for the production of a matrix containing only one sound performance, and at the same time it is possible to produce two sound tapes during the same time period which was necessary heretofore for the manufacture of only one tape. Additional time may be required if the records upon the matrix are made successively and, furthermore, some time may be consumed in the cutting of the tapes. This additional amount of time, however, is quite small as compared to the gain of time which results from the common manufacture of matrices and the common molding of the bands.

The process in accordance with the present invention is particularly advantageous when two or more identical sound records having the same subject matter are cut simultaneously in the wax band. In that case a plurality of cutting heads is used, the heads being arranged the one next to the other. These heads may be off-set and may be controlled by the same electric oscillations. According to one embodiment of the inventive idea two cutting heads are rigidly inter-connected and are controlled by a common feed mechanism in such manner that the cross-feeds for effecting the connection of adjacent sound lines take place at the same places with respect to the inscribed sound.

The invention will appear more clearly from the following detailed description when taken in connection with the accompanying drawing showing, by way of example, preferred embodiments of the inventive idea.

In the drawing:

Figure 1 is a diagram illustrating in plan view the recording of a wax band in accordance with the present invention.

Figure 2 shows, in cross-section, a wax band recorded in accordance with the invention.

Figure 3 shows, in cross-section, a matrix made in accordance with the invention.

Figure 4 shows, in cross-section, a die made in accordance with the invention.

Figure 5 shows a band-formed pressing matrix along with a sound tape molded on the matrix.

Figure 6 is a section through the sound tape shown in Figure 5.

A wax band used for recording purposes consists of a supporting film 1, shown in Figure 2, and a thin wax film 2 which is applied to the film 1. This wax film is used for recording under suitable temperature and moisture conditions any desired sound record by means of a cutting stylus which is not shown in the drawing and which is carried by cutting box 7. During the recording the wax tape extends in the form of an endless band and cutting of the sound track is effected in the form of a number of sound lines 3 which extend parallel to the edge of the band and which pass into each other at 4. As shown in Figure 1, the transition from one sound line to the other is effected stepwise.

After the first group of sound lines 3 has been cut in the wax band, a second group of sound lines 5 is cut on another portion of the same band, leaving an unrecorded zone 6 between the recorded sections 3 and 5. The width of the unrecorded zone 6 should be substantially equal to twice the width of the unplayed marginal edges of the sound tape to be produced.

In the described wax band two separate recordings were made side by side. It is apparent that the same wax band may be utilized for providing three or more recordings which will be located side by side and which will be separated by smooth unplayed zones, each of such zones being equal in width to twice the width of the marginal edges of the completed tape.

Instead of recording two different sound performances consecutively in the described manner it is possible to record the same sound performance twice simultaneously by the use of two cutting heads 7 and 8 which are shown in Figure 1. In that case the sound track 3 will be identical with sound track 5. For this purpose the two cutting heads 7 and 8 are mounted on the same arm at a distance from each other which corresponds to the distance between the inscribed zones 3 and 5.

It is possible to offset the cutting heads 7 and 8 in relation to the longitudinal direction of the tape.

When the two cutting heads 7 and 8 are used to provide simultaneously the same recordings they will be controlled by the same electrical signals, and their movement will be effected by a common feed mechanism 9 which is indicated diagrammatically in Figure 1. Due to this arrangement the two sound recordings will be identical, and the transitions from one sound track to the next sound track will take place at the same places.

After the wax band has been completed its recorded surface is made electrically conductive by means of cathode spraying or by any other suitable means. Then the band is placed in an electro-plating bath and a matrix is produced on the surface of the band which is a negative of the recorded original wax band. This matrix is shown in Figure 3. It has sound ridges corresponding to sound groves upon the wax band.

From the band-shaped original matrix, after the application of a suitable separating medium on the surface, known in the art, there is produced in the electro-plating bath a band-shaped die which is shown in Figure 4. From this die of Figure 4, again after the application of a separating medium to the surface of the die, there is formed in the electro-plating bath a metallic mold which constitutes the actual band-shaped pressing matrix. This pressing matrix is shown in Figure 5.

This band-shaped pressing matrix is passed along with a hot moldable tape through a pressing calendar in which the surface of the hot moldable tape is softened and then the sound ridges are impressed therein in the form of sound grooves. Upon completion of the molding operation the pressing matrix and the pressed tape remain in contact with each other until the pressed portion of the tape has been sufficiently hardened. The tape may be cooled to accelerate the hardening operation. Then the tape is carefully separated from the pressing matrix. Figure 5 illustrates the pressing matrix in engagement with the sound tape 10 while Figure 6 shows the same sound tape 10 after it has been separated from the pressing matrix.

It is apparent that instead of forming the sound tape by the described pressing operation the sound tape mass may be sprayed in the form of a thin layer upon a band-form matrix containing the negative of the sound recording. The sprayed layer will be allowed to harden and then will be removed from the matrix.

As shown in Figure 6 the tape 10 made by pressing or by spraying contains two adjacent recordings 11 and 12 which are separated by an intermediate unrecorded zone 13. Then the tape is cut longitudinally along the center of zone 13 to produce two identical sound tapes each of which has one-half of the width of the pressed or sprayed sound tape 10. These two tapes may be connected at their ends to form endless bands if sound tapes recorded on one side are to be produced. The ends of the tape are preferably joined after the tape has been wound into a coil.

It is also possible to manufacture tapes which are recorded on both sides and then to twist their ends to the extent of 180° before interconnecting these ends. Then endless tapes will be produced the recordings of which will move from one side of the tape to the other side of the tape.

It is apparent from the above that the time required for producing from a wax band a pressed or sprayed tape containing two tracks is practically the same as the time which was used heretofore for making a pressed or sprayed tape carrying a single group of sound tracks. In accordance with the process of the present invention the time during which two sound tapes can be produced is diminished to one-half. The somewhat higher costs of current during the matrix production by electro-deposition and the somewhat increased space requirements of the electro-depositing installations are substantially less than the costs necessary if two jointly produced tapes are to be produced individually or if two identical electro-plating installations are to be used in which only one matrix provided with a single sound track group can be made at one time. It is thus apparent that the process of the present invention constitutes a substantial saving in time as well as expenses.

It is further apparent that the example shown above has been given solely by way of illustration and not by way of limitation and that it is subject to many variations and modifications within the scope of the present invention. All such variations and modifications are to be included within the scope of the present invention.

What is claimed is:

In a process for the production from an original wax band of endless sound tapes having a sound track consisting of a plurality of sound lines substantially parallel to the edge of the tape and leading one into another; the steps of simultaneously cutting two adjacent identical sound recordings in a unitary wax band, each recording consisting of a group of sound lines, while leaving an unrecorded zone in the band between the recordings the width of which is equal to twice the width of the unplayed marginal edges of a finished sound tape; producing from the wax band so recorded a unitary band-form matrix containing negatives of both sound recordings; molding the sound recordings from said matrix in the sound tape; cutting the tape longitudinally between the individual sound recordings obtained by the molding and joining together the two ends of each of the cut tapes to form two separate identical endless bands.

References Cited in the file of this patent

UNITED STATES PATENTS

| | | |
|---|---|---|
| 437,423 | Edison | Sept. 30, 1890 |
| 2,090,957 | Bender | Aug. 24, 1937 |
| 2,214,406 | Daniel | Sept. 10, 1940 |
| 2,604,549 | Begun | July 22, 1952 |
| 2,686,057 | Woolf | Aug. 10, 1954 |

FOREIGN PATENTS

| | | |
|---|---|---|
| 824,591 | France | Nov. 10, 1937 |